(12) United States Patent
Cappello

(10) Patent No.: US 11,403,068 B2
(45) Date of Patent: Aug. 2, 2022

(54) EFFICIENT HARDWARE IMPLEMENTATION OF THE EXPONENTIAL FUNCTION USING HYPERBOLIC FUNCTIONS

(71) Applicant: Xilinx, Inc., San Jose, CA (US)

(72) Inventor: Stefano Cappello, Edinburgh (GB)

(73) Assignee: XILINX, INC., San Jose, CA (US)

( * ) Notice: Subject to any disclaimer, the term of this patent is extended or adjusted under 35 U.S.C. 154(b) by 201 days.

(21) Appl. No.: 17/001,060

(22) Filed: Aug. 24, 2020

(65) Prior Publication Data

US 2022/0057995 A1    Feb. 24, 2022

(51) Int. Cl.
*G06F 7/556* (2006.01)
*G06F 7/483* (2006.01)
*G06F 7/544* (2006.01)
*G06F 7/57* (2006.01)

(52) U.S. Cl.
CPC ............... *G06F 7/556* (2013.01); *G06F 7/483* (2013.01); *G06F 7/5443* (2013.01); *G06F 7/57* (2013.01)

(58) Field of Classification Search
CPC ........ G06F 7/556; G06F 7/5443; G06F 7/548; G06F 7/544; G06F 7/483; G06F 7/57; G06F 2207/556; G06F 2207/5561; G06F 2101/04; G06F 2101/08–10; G06F 1/03–0307
See application file for complete search history.

(56) References Cited

U.S. PATENT DOCUMENTS 10,713,013 B1 *  7/2020  Old ........................ G06F 7/556
2013/0339564 A1 * 12/2013  Nogueira .................. G06F 1/03
                                                              710/305

OTHER PUBLICATIONS

Shaik, Ateeq. Hardware Implementation of the Exponential Function Using Taylor Series and Linear Interpolation 2014, https://www.eit.lth.se/sprapport.php?uid=805. (Year: 2014).*
A. Boudabous, F. Ghozzi, M. W. Kharrat and N. Masmoudi, "Implementation of hyperbolic functions using CORDIC algorithm," Proceedings. The 16th International Conference on Microelectronics, 2004. ICM 2004., 2004, pp. 738-741, doi: 10.1109/ICM.2004.1434772. (Year: 2004).*

(Continued)

*Primary Examiner* — Matthew D Sandifer
*Assistant Examiner* — Huy Duong
(74) *Attorney, Agent, or Firm* — Patterson + Sheridan, LLP

(57) ABSTRACT

Apparatus and associated methods relate to determining a natural exponent from a digital word input by splitting the digital word, and retrieving a precalculated and predetermined value from a data store at an address defined by the first word. In an illustrative example, the retrieved value may be a hyperbolic sum. The hyperbolic sum may be multiplied by the second word. The hyperbolic sum may be scaled, and summed with the multiplication result to generate a scaled exponential value. The scaled exponential value may be scaled to produce an exponential value representing $e^x$. In various examples, the digital word input may be in a fixed point or a floating point format, or converted therebetween. In various embodiments, the data store may be a lookup table. Various examples may provide a compact and versatile architecture for determining a natural exponent with minimized hardware resources.

20 Claims, 14 Drawing Sheets

(56) References Cited

OTHER PUBLICATIONS

Florent de Dinechin, Jérémie Detrey. Parameterized floating-point logarithm and exponential functions for FPGAs. Microprocessors and Microsystems: Embedded Hardware Design (MICPRO), Elsevier, 2006, 31 (8), pp. 537-545. 10.1016/j.micpro.2006.02.008. ensl-00542213.

Jamro, Ernest, et al., "FPGA Implementation of 64-Bit Exponential Function for HPC", Field Programmable Logic and Application, 2007. FPL 2007. International Conference on IEEE, Aug. 1, 2007, pp. 718-721.

\* cited by examiner

EFFICIENT HARDWARE IMPLEMENTATION OF THE EXPONENTIAL FUNCTION USING HYPERBOLIC FUNCTIONS

TECHNICAL FIELD

Various embodiments relate generally to exponent calculation circuits.

BACKGROUND

Exponential functions are functions of the form $z=m^n$, where m is a base and n is an exponent. Exponential functions are unique because the derivative of an exponential function of a real variable is directly proportional to the function's value. For natural exponential functions, where m is Euler's number (e), the constant of proportionality is 1, such that the function is its own derivative. Ubiquitous in pure and applied mathematics, exponential functions model relationships in which a constant change in the independent variable results in the same percentage change in the dependent variable. Such relationships may occur, for example, in various natural and social sciences, such as population growth or compounding interest. Exponential relationships also commonly arise in physics, chemistry, engineering, biology, and economics.

Hyperbolic functions are defined in terms of particular combinations of natural exponential functions $e^X$, and $e^{-X}$. The hyperbolic sine function may be expressed as $$\sinh(x) = \frac{e^x - e^{-x}}{2}.$$

The hyperbolic cosine function may be expressed as $$\cosh(x) = \frac{e^x + e^{-x}}{2}.$$

Thus $e^x$ may be expressed in relation to hyperbolic functions as:

$$\sinh(x) + \cosh(x) = \frac{e^x - e^{-x}}{2} + \frac{e^x + e^{-x}}{2} = e^x.$$

Error, in relation to applied mathematics, is the difference between a true or reference value and an estimate or approximate of that value. Error analysis may be used to evaluate the propagation of numerical errors in numerical modeling or approximation of real systems and functions as parameters of the approximation or model vary. Error analysis may be used to evaluate the resolution or precision of a calculation.

SUMMARY

Apparatus and associated methods relate to determining a natural exponent from a digital word input by splitting the digital word, and retrieving a precalculated and predetermined value from a data store at an address defined by the first word. In an illustrative example, the retrieved value may be a hyperbolic sum. The hyperbolic sum may be multiplied by the second word. The hyperbolic sum may be scaled, and summed with the multiplication result to generate a scaled exponential value. The scaled exponential value may be scaled to produce an exponential value representing $e^X$. In various examples, the digital word input may be in a fixed point or a floating point format, or converted therebetween. In various embodiments, the data store may be a lookup table. Various examples may provide a compact and versatile architecture for determining a natural exponent with minimized hardware resources.

Various embodiments may achieve one or more advantages. For example, some embodiments may advantageously reduce the resources required to calculate a natural exponent from a digital signal. Some embodiments may be configured to compress the depth of a lookup table required to calculate a natural exponent by at least half. Some embodiments may be advantageously implemented as a compact and versatile architecture suitable for accommodating the wide dynamic range of the exponential function with limited hardware availability. Some embodiments may allow the natural exponent to be calculated using a single digital signal processor (DSP), using only logic gates, or using a resource-optimized combination thereof. Some embodiments may be advantageously implemented using only a single multiply-accumulation unit.

In one exemplary aspect, a natural exponent computation circuit includes: a splitter circuit configured to receive a fixed point word and split it into a first word and a second word; a retrieval circuit configured to retrieve from a data store, at an address defined by the first word, a predetermined and precalculated hyperbolic sum; a multiplier circuit configured to multiply the hyperbolic sum and the second word together, and to output a multiplied hyperbolic sum; a first scaling circuit configured to receive the hyperbolic sum and scale it by a first factor; a summer circuit configured to add together the scaled hyperbolic sum and the multiplied hyperbolic sum and generate a scaled second sum; and a second scaling circuit configured to scale the scaled second sum by a second factor, and output an approximation of $e^X$.

The multiplier circuit and summer circuit may be at least partially implemented in at least one digital signal processor (DSP). At least one of the following may be at least partially implemented as logic gates: the multiplier circuit, the summer circuit, and the data store. The data store may be a lookup table. The lookup table may be configured to store entries in a fixed point format. The lookup table may have depth of $2^B$, where B is a total number of bits in the first word. The data store may be configured to store entries in a floating point format.

The first factor may be $2^{B-I}$, where B is a total number of bits of the first word, and I is a total number of integer bits in the first word, and the first scaling circuit may right zero pad the hyperbolic sum by B-I bits. The second factor may be $1/(2^{B-I})$, where B is a total number of bits, and I is a total number of integer bits in the first word, and the second scaling circuit may bitwise right shift the second sum by B-I bits.

The natural exponent calculation circuit may also include a floating point to fixed point conversion circuit before the splitter circuit, where the conversion circuit is configured to receive a floating point input and convert it into the fixed point word received by the splitter circuit. The natural exponent calculation circuit may also include a fixed point to floating point conversion circuit after the second scaling circuit, where the conversion circuit is configured to receive the output approximation of $e^X$ in a fixed point format and output it in a floating point format.

The second word may represent a numerical value less than 1. The circuit may be configured where: fixed point word is N bits long, the first word is the first B bits of the fixed point word, the second word is the last A bits of the fixed point word, N=A+B, and a binary point of the fixed point word is contained in the first word. B may be chosen such that the approximation of $e^X$ is accurate within a predetermined error limit.

In another exemplary aspect, a method to efficiently calculate an exponent in a digital circuit may include: receiving a digital fixed point word, X, being N bits long, splitting the first B bits of X into a first word, Wb, and the remaining A bits of X into a second word, Wa, where the first word comprises I integer bits and B-I fractional bits, and where N=A+B and X=Wb+Wa; retrieving from a data store, at an address defined by Wb, a predetermined and precalculated hyperbolic sum representing sinh(Wb)+cosh(Wb); multiplying the hyperbolic sum and Wa together, and generating a multiplied hyperbolic sum representing [sinh(Wb)+cosh(Wb)]*[Wa]; scaling the hyperbolic sum by a scaling factor K to generate a scaled hyperbolic sum representing [sinh(Wb)+cosh(Wb)]*K; summing the scaled hyperbolic sum with the multiplied hyperbolic sum, to generate a scaled second sum representing [sinh(b)+cosh(b)]*[Wa+K]; and scaling the scaled second sum by 1/K, thereby generating a representation of [sinh(Wb)+cosh(Wb)]*[Wa/K+1] as an approximation of $e^X$. The multiplying step and the summing step may be at least partially implemented in at least one digital signal processor (DSP). The data store may be a lookup table configured to store entries in a fixed point format, and the lookup table may have a depth of $2^B$. First word Wb may include a binary point of X, K may be $2^{B-I}$, scaling the hyperbolic sum by K may include right zero padding the hyperbolic sum by B-I bits, and scaling the scaled second sum by 1/K may include bitwise right shifting of the second sum by B-I bits. B may be chosen such that the approximation of $e^X$ is accurate within a predetermined error limit.

In another exemplary aspect, at least one non-transient computer readable medium may provide a program of instructions that, when executed by a processor, cause operations to calculate a natural exponent. The operations may include: receiving a digital fixed point word, X, being N bits long; splitting the first B bits of X into a first word, Wb, and the remaining A bits of X into a second word, Wa, where the first word includes I integer bits and B-I fractional bits, and wherein N=A+B and X=Wb+Wa; retrieving from a data store, at an address defined by Wb, a predetermined and precalculated hyperbolic sum representing sinh(Wb)+cosh(Wb); multiplying the hyperbolic sum and Wa together, and generating a multiplied hyperbolic sum representing [sinh(Wb)+cosh(Wb)]*[Wa]; scaling the hyperbolic sum by a scaling factor K to generate a scaled hyperbolic sum representing [sinh(Wb)+cosh(Wb)]*K; summing the scaled hyperbolic sum with the multiplied hyperbolic sum, to generate a scaled second sum representing [sinh(b)+cosh(b)]*[Wa+K]; and scaling the scaled second sum by 1/K, thereby generating a representation of [sinh(Wb)+cosh(Wb)]*[Wa/K+1] as an approximation of $e^X$.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Apparatus and associated methods relate to compact and versatile calculation of a natural exponent. To aid understanding, this document is organized as follows. First, an exemplary platform (e.g., a field programmable gate array FPGA) suitable to perform data communication is briefly introduced with reference to FIG. 1. Second, with reference to FIG. 2, the discussion turns to an exemplary use case implementing a compact calculation of a natural exponent. Third, with reference to FIGS. 3A-9, the discussion turns to exemplary circuits and methods that illustrate various implementations for compact calculation of a natural exponent. Finally, with reference to FIG. 10, another exemplary platform (e.g., a system-on-Chip (SOC)) suitable to perform data communication and DSP is briefly introduced.

Figure 1:
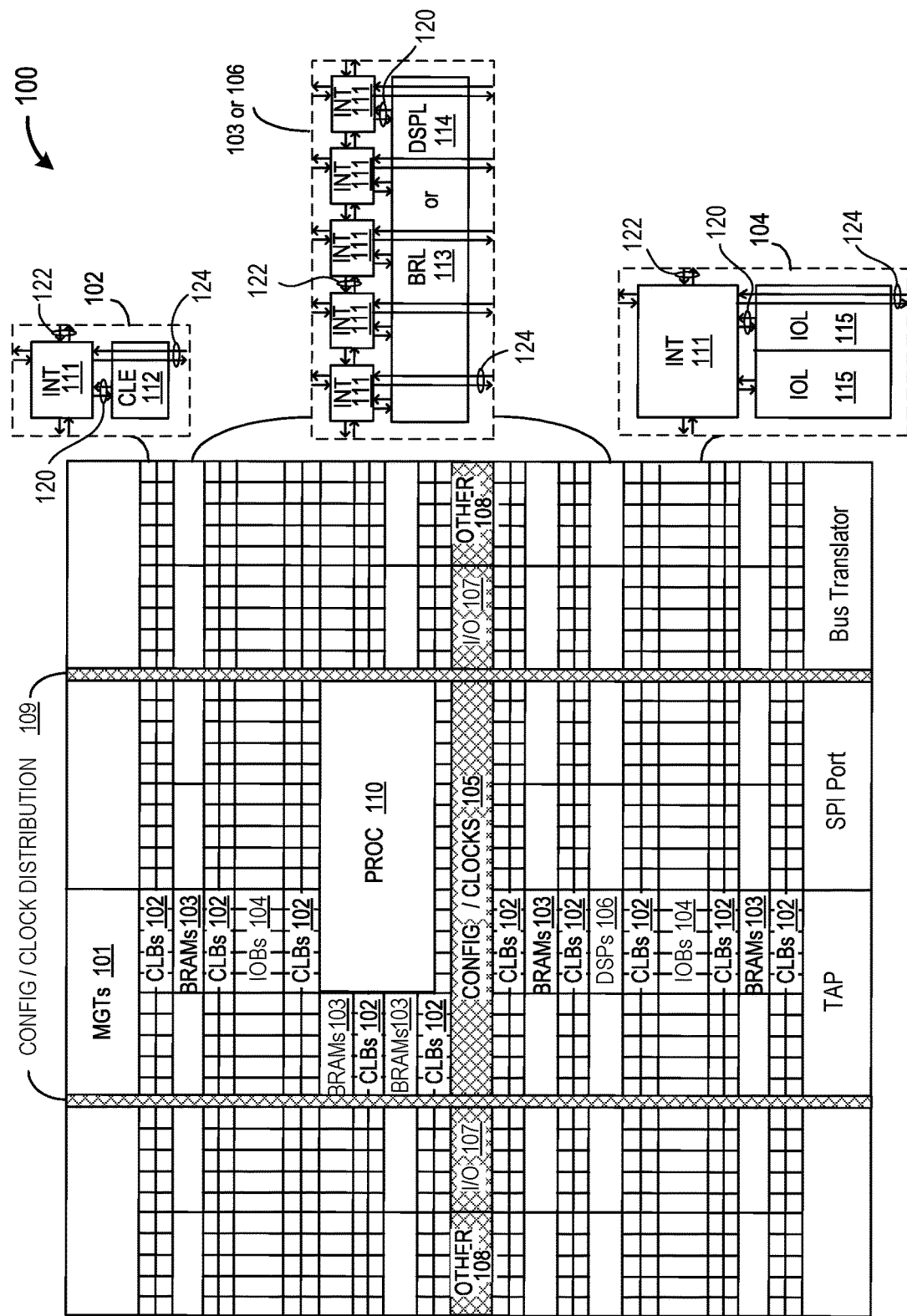
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Integrated circuits (IC) (e.g., FPGA), such as the programmable IC 100, for example, may be used in determining a natural exponent. The architecture of the IC may be advantageously configured to efficiently calculate a natural exponent from a digital word input by splitting the word into a first word and second word and retrieving a hyperbolic sum from a data store using the first word.

Figure 2:
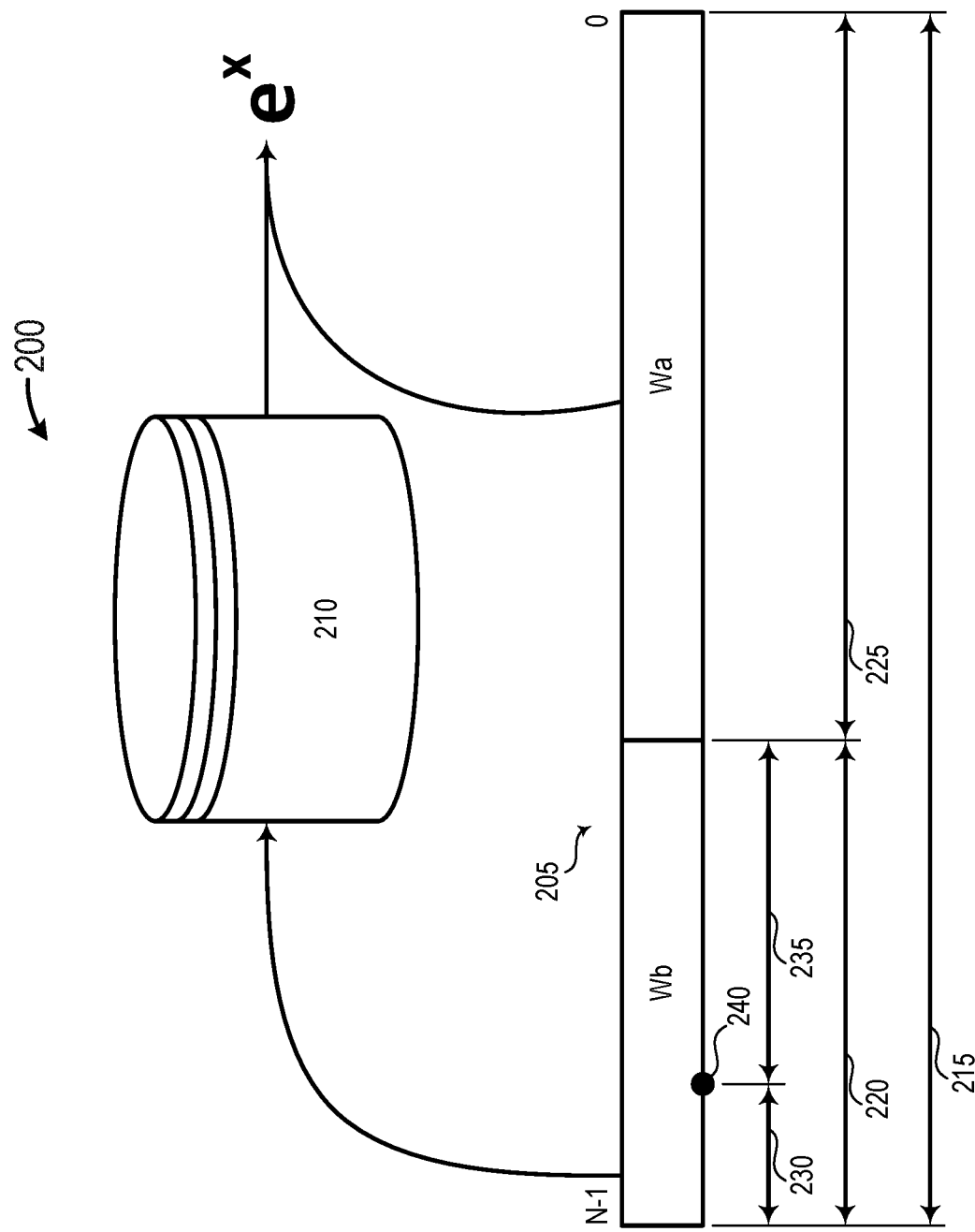
FIG. 2 depicts an exemplary use case of a natural exponent computation circuit.

FIG. 2 depicts an exemplary use case 200 of a natural exponent computation circuit. A fixed point word, X 205, represents an exponent which may be intended as an exponent to which to raise Euler's number (the mathematical constant represented as "e"). Word X is N bits long 215 [0:N−1], which may be represented as $e^X$. Word X is split into first word Wb, being B bits long 220, and second word Wa, being A bits long 225. First word Wb contains the binary point 240 and, thereby, includes I integer bits 230 and F fractional bits 235. The remaining fractional bits of word X are in A. Accordingly, N=B+A, because the number of bits in X equal the number of bits in Wb and the number of bits in Wa. Similarly, B=I+F, because the number of bits in B equals the number of integer bits and the number of fractional bits.

Word Wb may be used as an address in a data store 210 containing hyperbolic trigonometric expressions which represent a result of $e^X$, or data sufficient to generate a desired representation of the result therefrom. The hyperbolic trigonometric expression may be used in further operations to generate a result of $e^X$, within a desired tolerance. Further operations may include summing, multiplication, or combination thereof. Further operations may also operation, for example, on Wa.

Accordingly, the exponential function may be advantageously implemented in various compact and versatile architectures using hyperbolics. For example, in some embodiments exponential calculation circuits may be advantageously implemented in embedded circuits (e.g., FPGAs or ASICs).

The dynamic range of the exponential function is quite large, which may cause digital implementation to be challenging. Various embodiments may advantageously implement properties of hyperbolic functions to compress the size of lookup tables used in calculating the exponential function, and to reduce the processing resources used in calculation. Some embodiments may be implemented using a single compressed lookup table and a single multiply accumulate unit which may be advantageous, for example, where area and resources are limited. In some embodiments, for example, compact exponential calculation circuits may be advantageously implemented and employed in convolutional neural networks (CNNs), in fast Fourier transform (FFT) circuits, and in digital signal processing (DSP) applications.

By way of illustration, the digital word X may be an exponent of Euler's number for which the result (y) is sought: $y=e^X$. However, $e^X$ can be expressed as a sum of hyperbolic functions:

$$y=e^X=\cosh(X)+\sinh(X) \qquad \text{Equation 1:}$$

where cosh is the hyperbolic cosine function, and sinh is the hyperbolic sine function.

X can be expressed as a sum of Wb and Wa scaled by a factor K, where X=Wb+Wa*K. For example, by way of illustration, Wa may be a fixed point word A bits long. Left zero-padding Wa to be N bits long, where the first B bits equal zero, the result is Wa/K, where $K=2^{B-I}$. K may be chosen suitably for a given implementation including, for example, based on whether fixed point or floating point numbers are used, the values of X, B, A, I, or F, or some combination thereof.

Then, y can be re-expressed using Wa*K and Wb, expanded out, and simplified:

$$y = e^X = \cosh\left(\frac{Wa}{K} + Wb\right) + \sinh\left(\frac{Wa}{K} + Wb\right) \quad \text{Equation 2A}$$

$$y = \sinh\left(\frac{Wa}{K}\right) * \sinh(Wb) + \cosh\left(\frac{Wa}{K}\right) * \cosh(Wb) + \quad \text{Equation 2B}$$
$$\sinh\left(\frac{Wa}{K}\right) * \cosh(Wb) + \cosh\left(\frac{Wa}{K}\right) * \sinh\left(\frac{Wa}{K}\right)$$

$$y = [\sinh(Wb) + \cosh(Wb)] * \left[\sinh\left(\frac{Wa}{K}\right) + \cosh\left(\frac{Wa}{K}\right)\right] \quad \text{Equation 2C}$$

Wb can be expressed as a function of the length of X, A (number of bits in Wa), N (number of bits in X), and I (number of integer bits in Wb), as:

$$Wb = \frac{\left\lfloor \frac{X}{2^A} \right\rfloor}{2^{(N-A-I)}} \quad \text{Equation 3}$$

Because Wa's value is determined by the fractional bits of X, it may be assumed that Wa<1. With that assumption, sinh(Wa) and cosh(Wa) may be simplified:

$$\lim_{Wa \to 0} \sinh(Wa) \cong Wa \quad \text{Equation 4A}$$

$$\lim_{Wa_s \to 0} \cosh(Wa) \cong \lim_{Wa \to 0} 1 + \frac{Wa^2}{24} + \ldots = 1 \quad \text{Equation 4B}$$

Because the limit of sinh(Wa) approaches Wa as Wa approaches zero, and the limit of cosh(Wa) approaches 1 as Wa approaches zero, when it is assumed that Wa<1, or especially if Wa<<1 (Wa is much less than 1), then sinh(Wa) may be approximated as Wa and cosh(Wa) may be approximated as 1. Accordingly, Equation 2C may be simplified to:

$$y \approx y_h = [\sinh(Wb) + \cosh(Wb)] * \left[\frac{Wa}{K} + 1\right]. \quad \text{Equation 5}$$

Figure 3A:
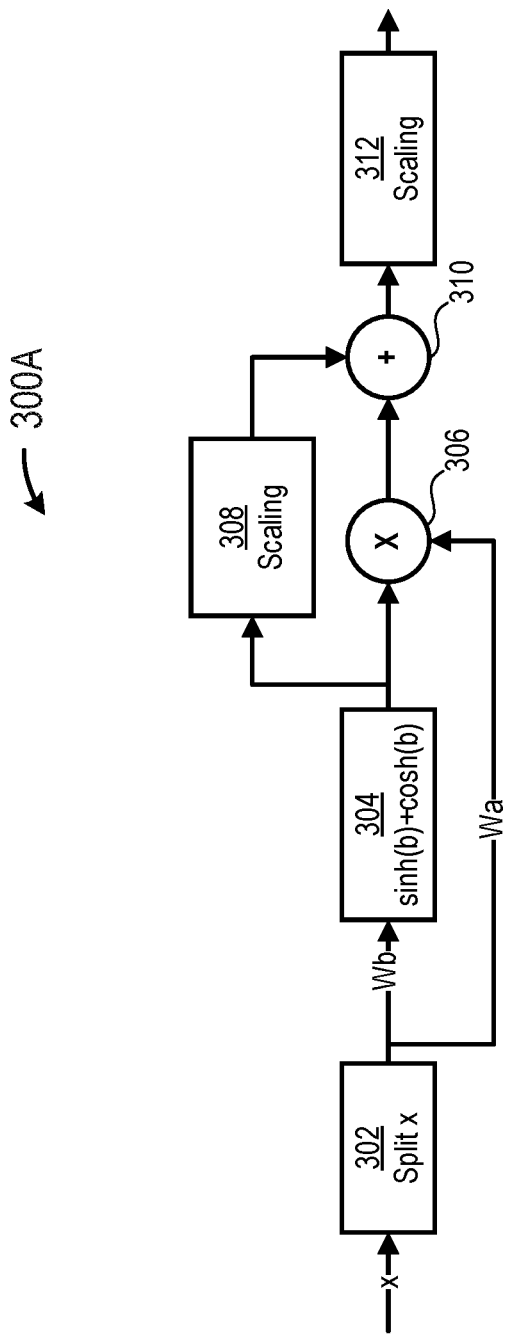
FIG. 3A depicts a block diagram of an exemplary natural exponent computation circuit.

FIG. 3A depicts a block diagram of an exemplary natural exponent computation circuit. Exponential calculation circuit 300A receives a fixed point word, X with N bits [0:N-1]. A splitting circuit 302 bitwise splits X into two words, a first word Wb with bits [B+1:N-1], and a second word Wa with bits [0:A-1], where A is the number of bits in Wa, B is the number of bits in Wb, and N=B+A. First word Wb is an address in data store 304 corresponding to a value representing sinh(Wb)+cosh(Wb). Data store 304 may be implemented, for example, as a lookup table, or portion thereof, having predetermined and precalculated values for sinh(Wb)+cosh(Wb). Data store 304 may be, for example, implemented in read-only memory (ROM), and may be implemented as a lookup table in random access memory (RAM), block RAM (BRAM), static RAM (SRAM), dynamic RAM (DRAM), or other appropriate data store. For example, by way of illustration and not limitation, data store 304 may be implemented as a lookup table of depth $2^B$ in BRAM, and having a predetermined and precalculated value of [sinh(Wb)+cosh(Wb)] for each value of Wb within a predetermined range. The predetermined range may be set according to a predetermined value of B. Splitting X into two words of B bits and A bits may advantageously reduce the size of multiplier 306 from a multiplier sufficient to operate on N bits to a multiplier sufficient to operate on the maximum of B or A bits.

The hyperbolic sum retrieved from data store 304 may be represented as:

$$\sinh(Wb) + \cosh(Wb) \quad \text{Equation 6:}$$

The hyperbolic sum is multiplied with Wa by the multiplication circuit 306, to achieve a multiplied hyperbolic sum which may be represented as:

$$[\sinh(Wb) + \cosh(Wb)] * Wa \quad \text{Equation 7:}$$

Scaling circuit 308 scales the hyperbolic sum retrieved from data store 304 by a factor K. In implementations in which X is a fixed point number, K may be, for example, $2^{B-I}$ where B is the number of bits in Wb, and I is the number of integer bits in B. In some implementations in which X is a fixed point number, scaling in scaling circuit 338 may be achieved, for example, by right zero padding the hyperbolic sum by B-I bits.

The multiplied hyperbolic sum and the scaled hyperbolic sum are then added in adding circuit 310, thereby generating a scaled exponential calculation which may be represented as:

$$[\sinh(Wb) + \cosh(Wb)] * (Wa + K) = [\sinh(Wb) + \cosh(Wb)] * \quad \text{Equation 8}$$
$$\left(\frac{Wa}{K} + 1\right) * K$$

Scaling circuit 312 then applies a scaling factor 1/K to the scaled exponential calculation to generate an exponential calculation. The scaling circuit 312 may, for example, such as in a fixed point implementation in which $K=2^{B-I}$, be a right bitwise shift by B-I bits.

The exponential calculation generated by scaling circuit 312 may be represented as:

$$\left\{[\sinh(Wb) + \cosh(Wb)] * \left(\frac{Wa}{K} + 1\right) * K\right\} * \quad \text{Equation 9}$$
$$\frac{1}{K} = [\sinh(Wb) + \cosh(Wb)] * \left(\frac{Wa}{K} + 1\right)$$

Per equation 5, this exponential calculation is approximately equal to $e^X$:

$$[\sinh(Wb) + \cosh(Wb)] * \left(\frac{Wa}{K} + 1\right) \approx e^X \quad \text{Equation 11}$$

Accordingly, a circuit implemented as depicted in FIG. 3A may be configured to advantageously calculate from an input X, the value of $e^X$, within an acceptable error limit, for a given range of X and size of N, A, and B.

Figure 3B:
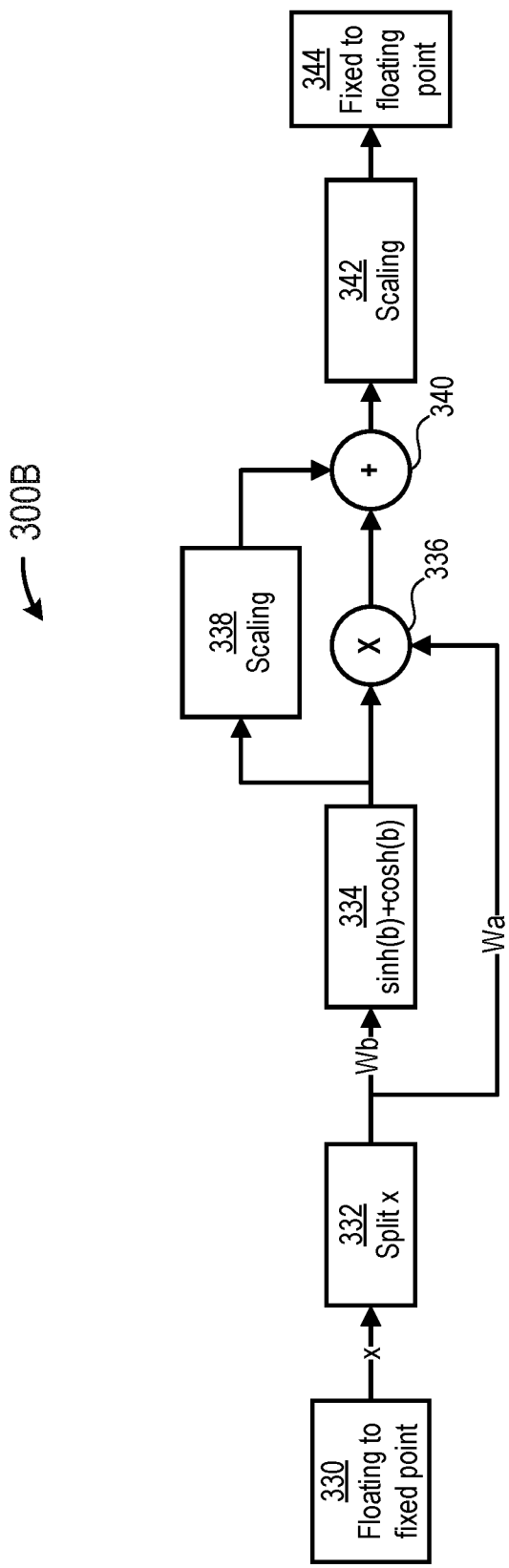
FIG. 3B depicts a block diagram of a compact and versatile exponent computation circuit accepting and outputting floating point values.

FIG. 3B depicts a block diagram of a compact and versatile exponent computation circuit accepting and outputting floating point values. Circuit 300B may be, for example, a similar circuit as implemented in FIG. 3A, with the addition of floating point conversion blocks at entry and exit of the circuit to allow floating point inputs to be received, converted into fixed point, an exponential calculation generated, and then be converted to a floating point output. In general, a floating point value is received and converted by floating to fixed point conversion circuit 330 into fixed point word X. Word X is split by splitting circuit 332 into first word Wb and second word Wa. A hyperbolic sum is retrieved from data store 334 at an address defined by Wb. The hyperbolic sum and Wa are multiplied by multiplier circuit 336 to generate a multiplied hyperbolic sum. The hyperbolic sum is scaled by factor K in scaling circuit 338, and the result is added to the multiplied hyperbolic sum by adding circuit 340 to generate a scaled exponential calculation. The scaled exponential calculation is scaled by a factor 1/K by scaling circuit 342, and the resulting fixed point exponential calculation is converted to a floating point value by fixed to floating point conversion circuit 344. The resulting floating point exponential calculation may be a representation of $e^x$ within an acceptable error limit.

Figure 3C:
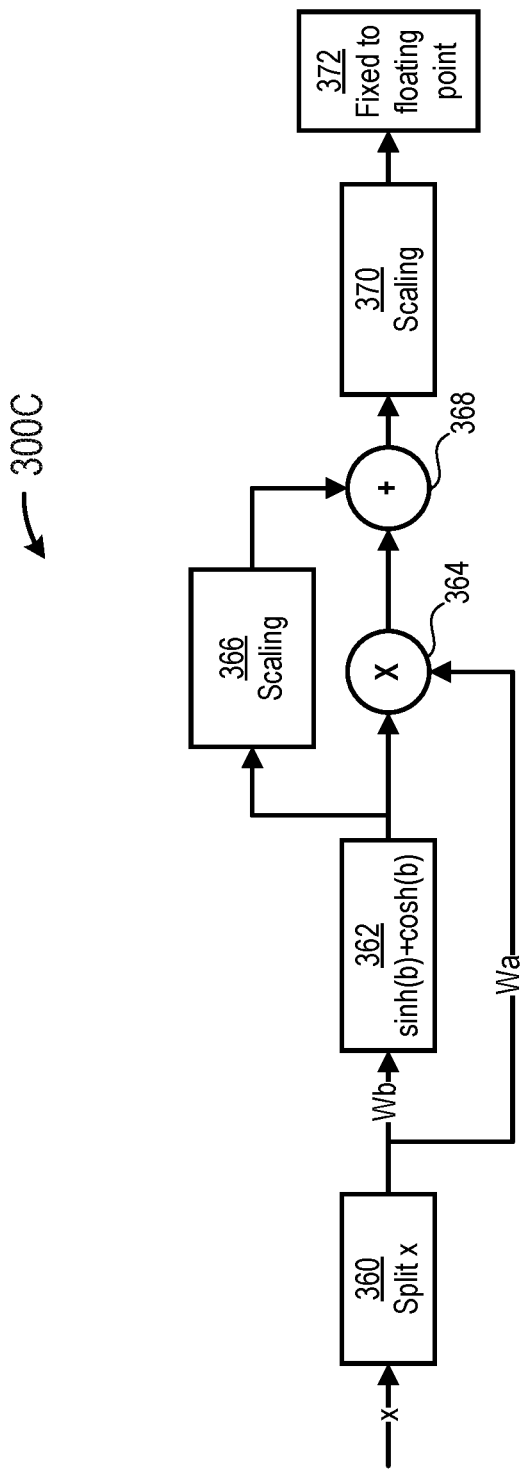
FIG. 3C depicts a block diagram of an exemplary natural exponent computation circuit accepting fixed point values and outputting floating point values.

FIG. 3C depicts a block diagram of an exemplary natural exponent computation circuit accepting fixed point values and outputting floating point values. Exponential calculation circuit 3000 may be, for example, a similar circuit as implemented in FIG. 3A, with the addition of a floating point conversion blocks at exit of the circuit to allow fixed point inputs to be received, an exponential calculation generated, and then be converted to a floating point output. In general, a fixed point word X is received and split by splitting circuit 360 into first word Wb and second word Wa. A hyperbolic sum is retrieved from data store 362 at an address defined by Wb. The hyperbolic sum and Wa are multiplied by multiplier circuit 364 to generate a multiplied hyperbolic sum. The hyperbolic sum is scaled by factor K in scaling circuit 366, and the result is added to the multiplied hyperbolic sum by adding circuit 368 to generate a scaled exponential calculation. The scaled exponential calculation is scaled by a factor 1/K by scaling circuit 370, and the resulting fixed point exponential calculation is converted to a floating point value by fixed to floating point conversion circuit 372. The resulting floating point exponential calculation may be a representation of $e^x$ within an acceptable error limit.

Figure 3D:
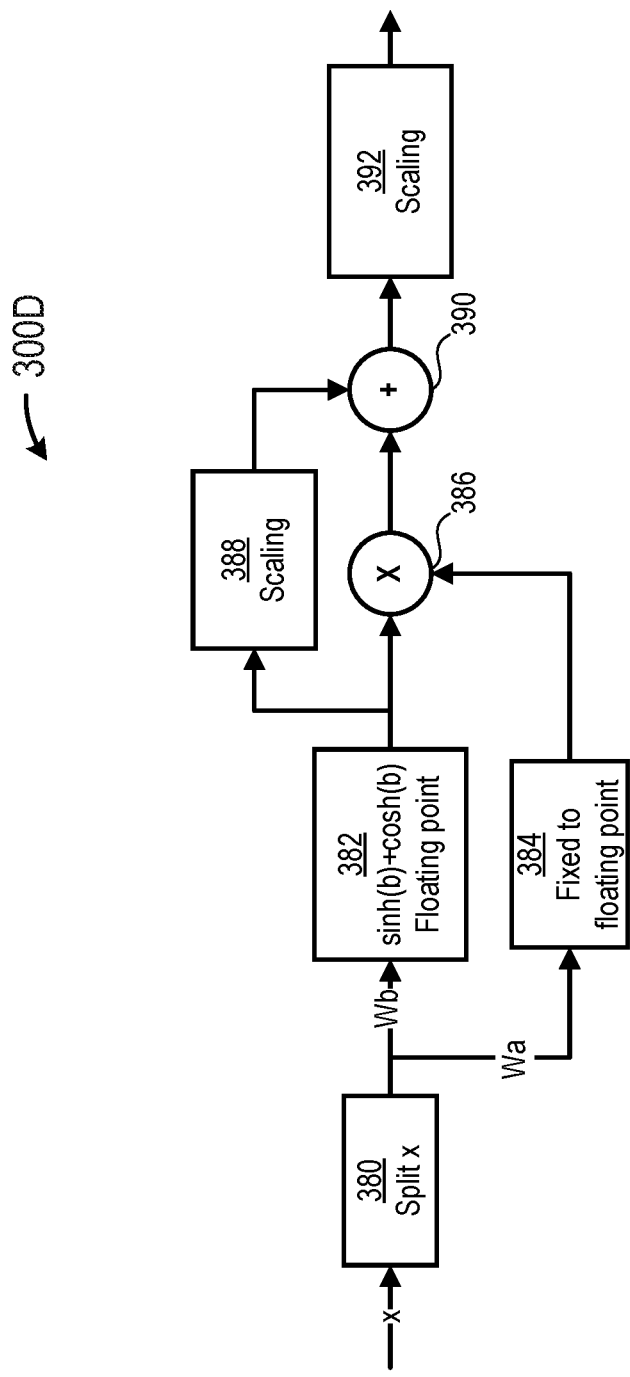
FIG. 3D depicts a block diagram of an exemplary natural exponent computation circuit provided with a floating point data store of hyperbolic sums.

FIG. 3D depicts a block diagram of an exemplary natural exponent computation circuit provided with a floating point data store of hyperbolic sums. Exponential calculation circuit 300D may be, for example, a similar circuit as implemented in FIG. 3A, with the data store being configured to store floating point values, and with the addition of a floating point conversion block to convert a second word to a floating point word, thereby allowing fixed point inputs to be received, an exponential calculation generated, and a native floating point output produced. In general, a fixed point word X is received and split by splitting circuit 380 into first word Wb and second word Wa. A hyperbolic sum in floating point format is retrieved from floating point data store 382 at an address defined by Wb. Data store 382 may be provided with preloaded and precalculated hyperbolic sums representing sinh(Wb)+cosh(Wb) in floating point formats. Wa is converted from fixed to floating point format in fixed to floating point conversion circuit 384.

The hyperbolic sum and Wa are multiplied by multiplier circuit 386 to generate a multiplied hyperbolic sum. The hyperbolic sum is scaled by factor K in scaling circuit 388, and the result is added to the multiplied hyperbolic sum by adding circuit 390 to generate a scaled exponential calculation. The scaled exponential calculation is scaled by a factor 1/K by scaling circuit 392. The resulting floating point exponential calculation may be a representation of $e^x$ within an acceptable error limit.

Figure 4:
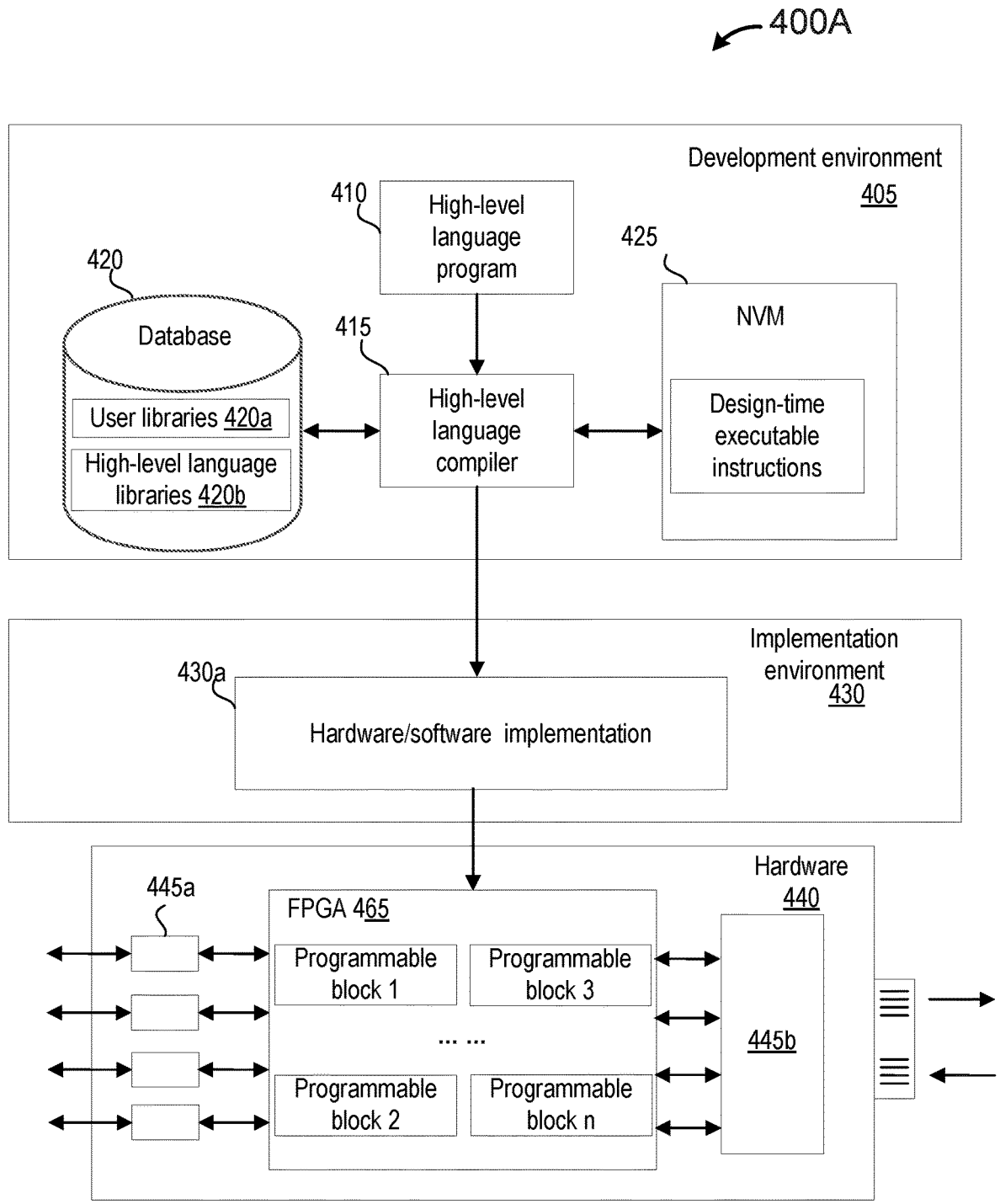
FIG. 4 depicts a block diagram of an exemplary system to use a high-level language representation to implement compact exponent computation in an integrated architecture.

FIG. 4 depicts a block diagram of an exemplary system to use a high-level language representation to implement compact exponent computation in an integrated architecture. Specifically, FIG. 4 depicts a generalized system to compile instructions in a high-level language (HLL) to configure, for example, any or all of n programmable logic blocks (1, 2, 3, . . . n). A configuration system 400A includes a development environment 405. A user may, via a user interface, use a HLL (e.g., P4 language) to generate, at design time, instructions that can produce, via register-transfer level (RTL) generation at compile time, a hardware architecture that, at run-time, can perform exponent computation with a compressed data store using the FPGA 465. The development environment 405 also includes a HLL compiler 415. The HLL compiler 415 operatively connects with the HLL program 410 and a database 420. In this depicted example, the database 420 includes user libraries 420a and HLL libraries 420b. The HLL compiler 415 may select available library files in the database 420 to compile HLL commands into one or more sets of instructions, which may also be referred to as data structures. During development, the HLL compiler 415 may store the sets of instructions in a data store or NVM 425 (non-volatile memory).

The configuration system 400A also includes an implementation environment 430. An implementation engineer, for example, may employ some compiler tools to convert the instructions stored in the NVM 425 into hardware/software implementations 430a (e.g., RTL (register transfer logic)) that can be loaded via a bitstream, for example, into a target device such as the FPGA 465, for example. In some embodiments, the implementation environment 430 may generate the appropriate data files to realize fixed hardware (e.g., in an ASIC) in accordance with the design specified by, for example, the user-input high level language programming in the development environment 405.

The configuration system 400A also includes a hardware environment 440. The hardware environment 440 may include, for example, a line card. In some embodiments, the hardware environment 440 may include a network interface card (NIC). In this depicted example, the hardware environment 440 includes a number of buffers 445a (e.g., which may form an I/O interface) that connect external signals into an FPGA (e.g., the FPGA 465). In the depicted example, the FPGA 465 includes n programmable logic blocks that represent programmable hardware resources available to realize circuitry in accordance with the design specified by, for example, the user-input high level language programming in the development environment 405. The FPGA 465 also connects with other devices 445b which may provide a variety of auxiliary functions.

Figure 5:
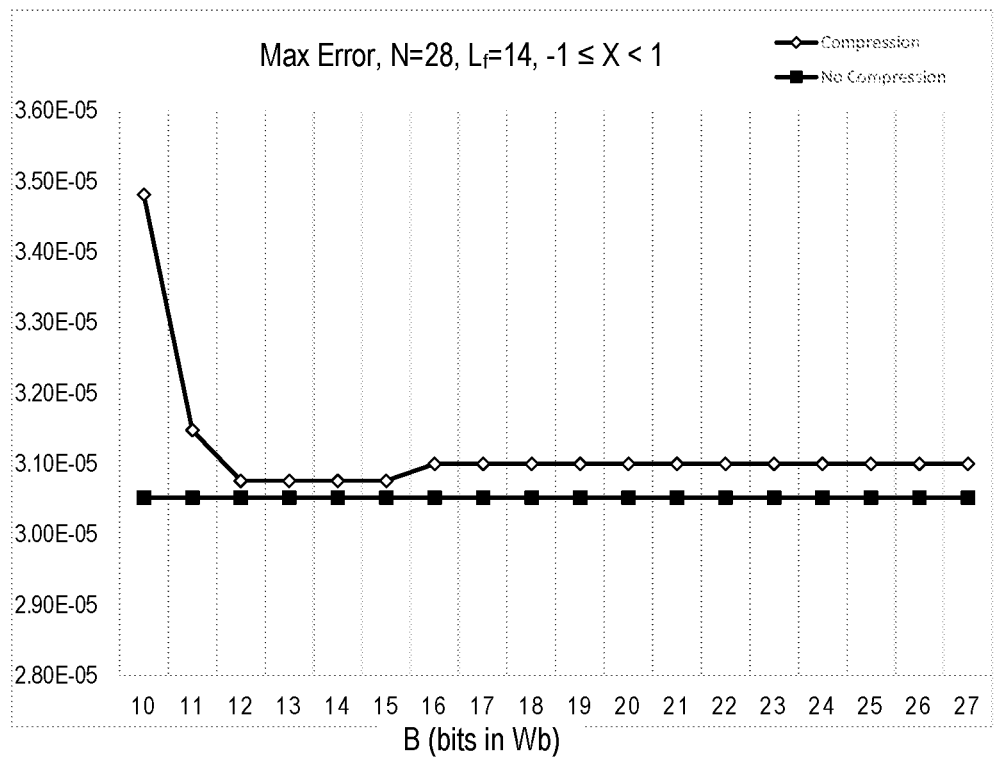
FIG. 5 depicts simulation results evaluating accuracy of an exemplary architecture with input dynamic range fixed.
Figure 5:
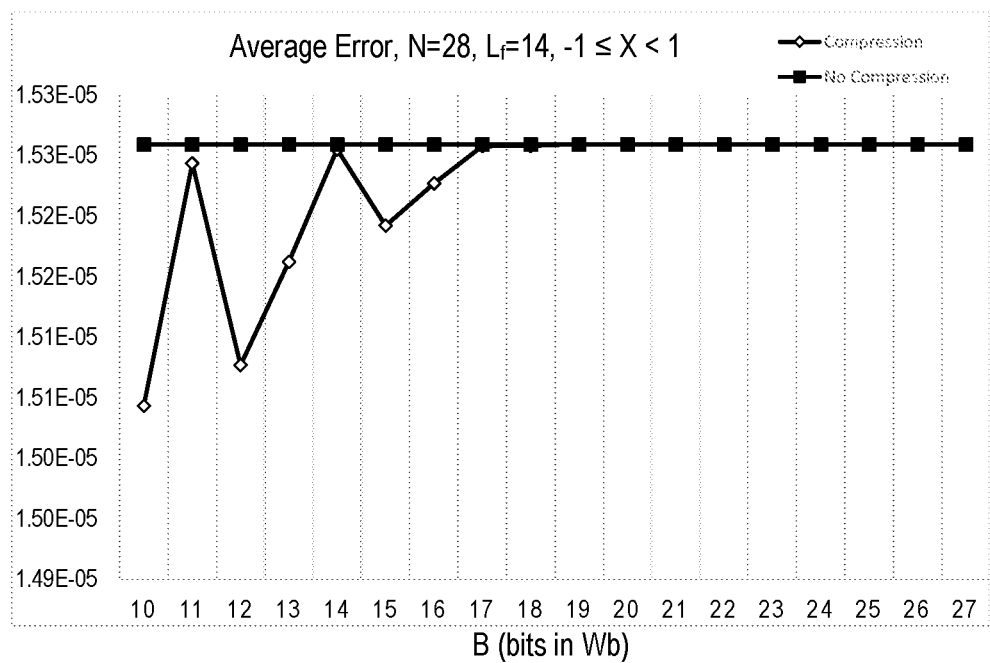

FIG. 5 depicts simulation results evaluating accuracy of an exemplary architecture with input dynamic range fixed. In various embodiments, accuracy of the exponent calculation depends on the number of bits B included in Wb. In some embodiments, such as in embodiments configured for fixed point input X having a predetermined number of integer bits I, accuracy depends on B indirectly as a result of the number of fractional bits F included in Wb (where F=B−I). As F increases, A decreases, thereby reducing the value of Wa. As Wa decreases, Wa approaches 0, and the simplifying assumptions in equations 4A and 4B, leading to simplified equation 5, becoming increasingly accurate.

Max error graph 501 compares the maximum error between an uncompressed implementation (e.g., an 'accurate' calculation of $e^X$) and a calculation in a compressed implementation, such as is shown in FIG. 3A, as B is varied in an illustrative example where N=28, $L_f$=14, and X is in the range [−1,1). As B approaches 12 bits, the max error drops from approximately $3.48 \times 10^{-5}$ to approximately $3.07 \times 10^{-5}$, and remains constant through 15 bits. At B=16 bits, the error rises somewhat to approximately $3.1 \times 10^{-5}$.

Average error graph 502 compares the average error between the uncompressed and compressed calculation in the same implementation as graph 501. The graph 502 shows that average error of the uncompressed calculation converged around B=17 and remained steady. Accordingly, for example, a value or range for B may be selected and predetermined according to a predetermined error limit. The range of B may be used to predetermine a width of a lookup table as $2^B$, and values of sinh(Wb)+cosh(Wb) for all addresses Wb in the data store, within the range of a word of B bits.

Figure 6:
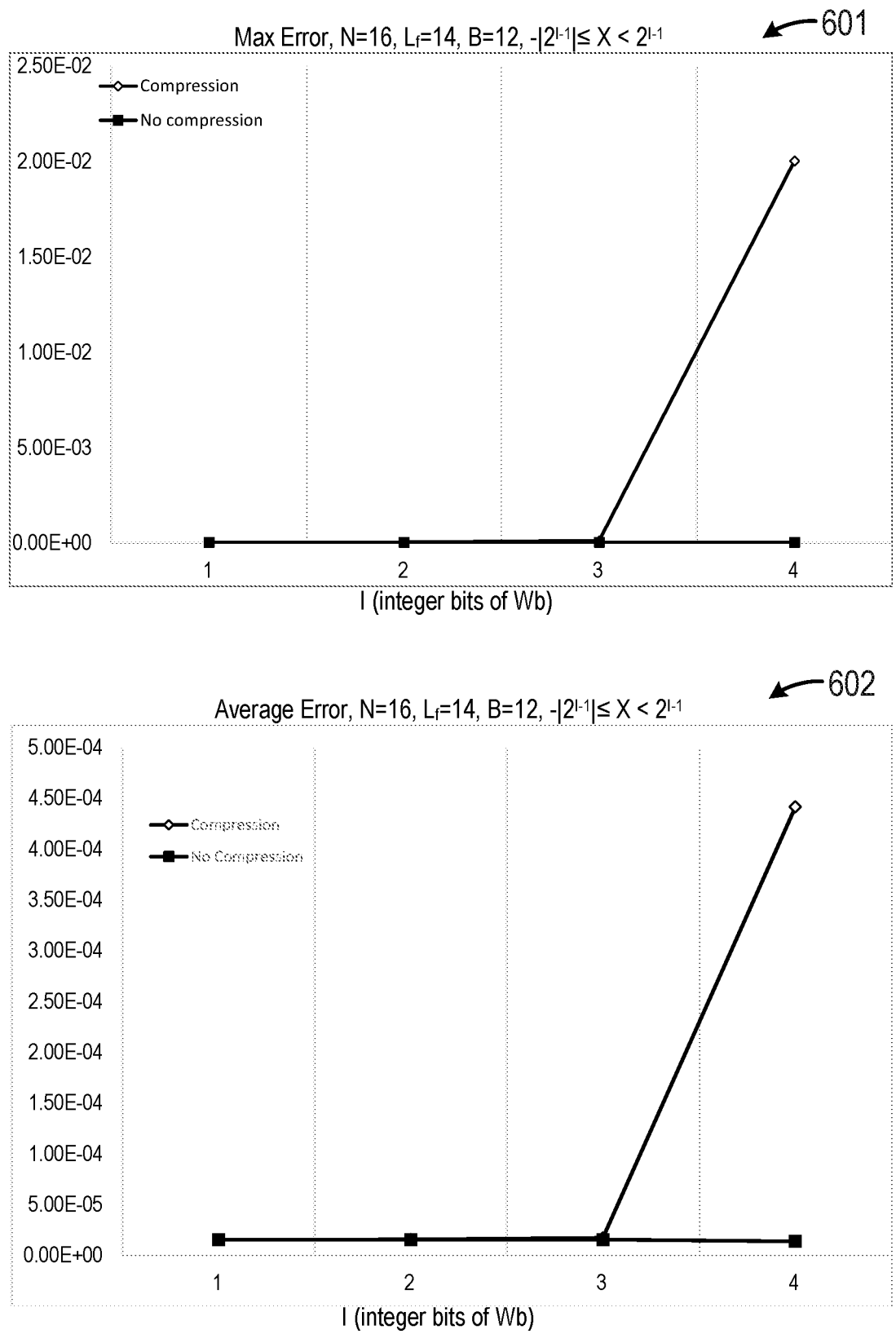
FIG. 6 depicts simulation results evaluating accuracy of an exemplary architecture as the input dynamic range varies.

FIG. 6 depicts simulation results evaluating accuracy of an exemplary architecture as the input dynamic range varies. Accuracy may depend, for example, on the number of integer bits (I) in first word Wb, before the binary point, such as when Wb is in a fixed point format. For example, when B is held constant, and I increases, the number of fractional bits (F) in Wb decreases. Accordingly, the accuracy may decrease, as the precision of the value represented and, therefore, the granularity of the lookup table, may decrease.

Max error graph 601 compares the maximum error between an uncompressed implementation (e.g., an 'accurate' calculation of $e^X$) and a calculation in a compressed implementation, such as is shown in FIG. 3A, as I is varied in an illustrative example where N=16, $L_f$=14, B=12, and X is in the range $[-|2^{I-1}|, 2^{I-1})$. Similarly, average error graph 602 compares the average error in the same simulation scenario. Below 3 bits, the error in the compressed implantation remains almost indistinguishable from the uncompressed implementation, at about $0.15 \times 10^{-4}$. After I=3 bits, the error begins rising. Accordingly, for example, a value or range for I may be selected and predetermined according to a predetermined error limit. For example, depending on a predetermined range of X, a value of I may be chosen sufficient to represent the value, and a value for B chosen, dependent on I, such that F is large enough to represent X with enough precision to remain within a predetermined error limit.

Figure 7A:
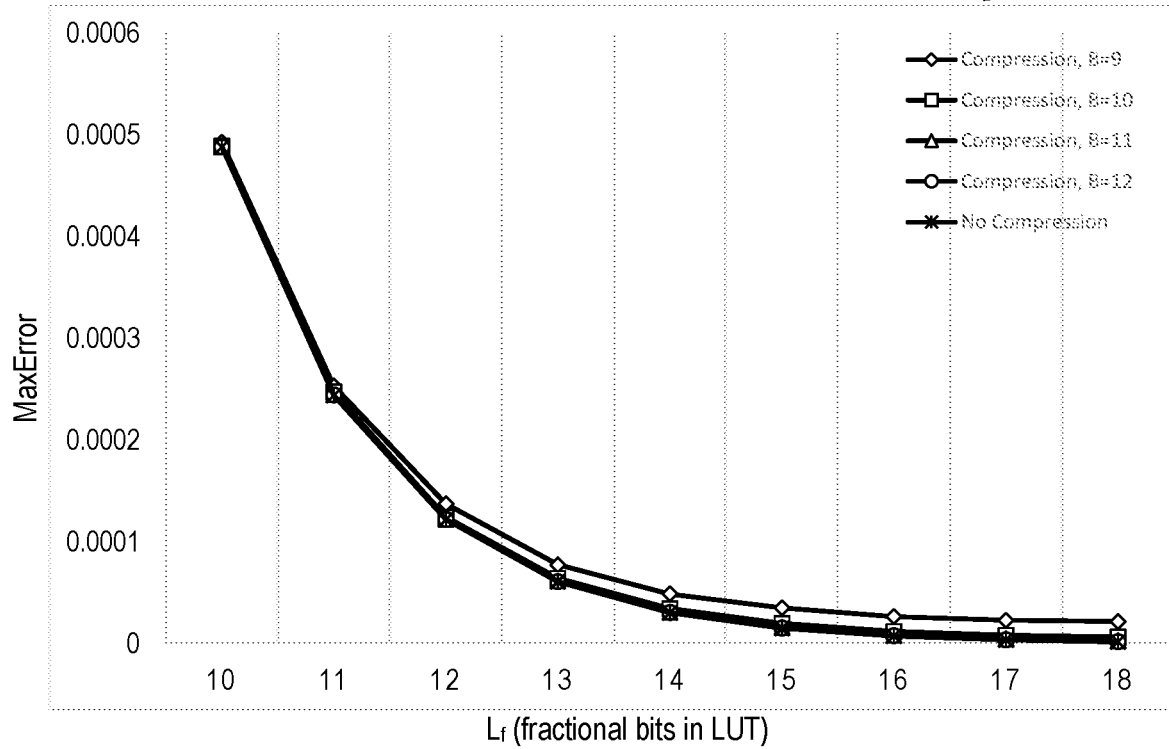
FIG. 7A depicts simulation results evaluating accuracy of an exemplary architecture as word width varies across a first input dynamic range.
Figure 7A:
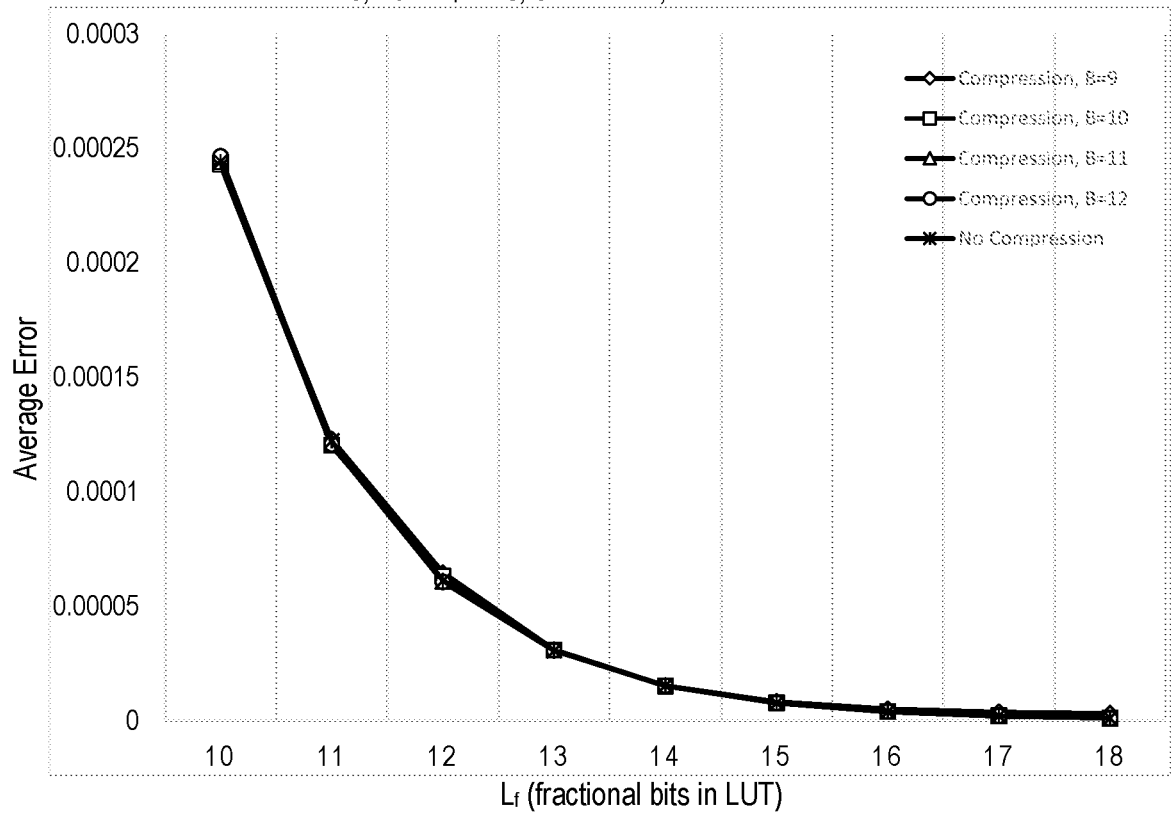

FIG. 7A depicts simulation results evaluating accuracy of an exemplary architecture as word width varies across a first input dynamic range. Accuracy may depend, for example, on the number of fractional bits in the predetermined and precalculated hyperbolic sums stored in a data store. The number of fractional bits stored may be represented by $L_f$. $L_f$ may, for example, be determined during a configuration process and may be, for example, dependent on X, B, I, F, or some combination thereof.

Max error graph 701 compares the maximum error between an uncompressed implementation (e.g., an 'accurate' calculation of $e^X$) and a calculation in a compressed implementation, such as is shown in FIG. 3A, as $L_f$ and B is varied in an illustrative example where N=16, $L_f$ is in the range [10,18], B is in the range [9,12], and X is in the range [−1,1). Similarly, average error graph 702 compares the average error in the same simulation scenario. Each distinct compressed series on the graphs 701 and 702 represents a separate value of B for which $L_f$ is varied and plotted against the error. As can be seen, the error decreases in a generally exponential decay as $L_f$ increases, with improvements in accuracy diminishing as $L_f$ continues to be increased. Similarly, error decreases as B increases, but with diminishing returns. The improvements in error by increasing B and $L_f$ are more marked when evaluating max error than average error, in which responses to increased B and $L_f$ can appear indistinguishable at this level.

Figure 7B:
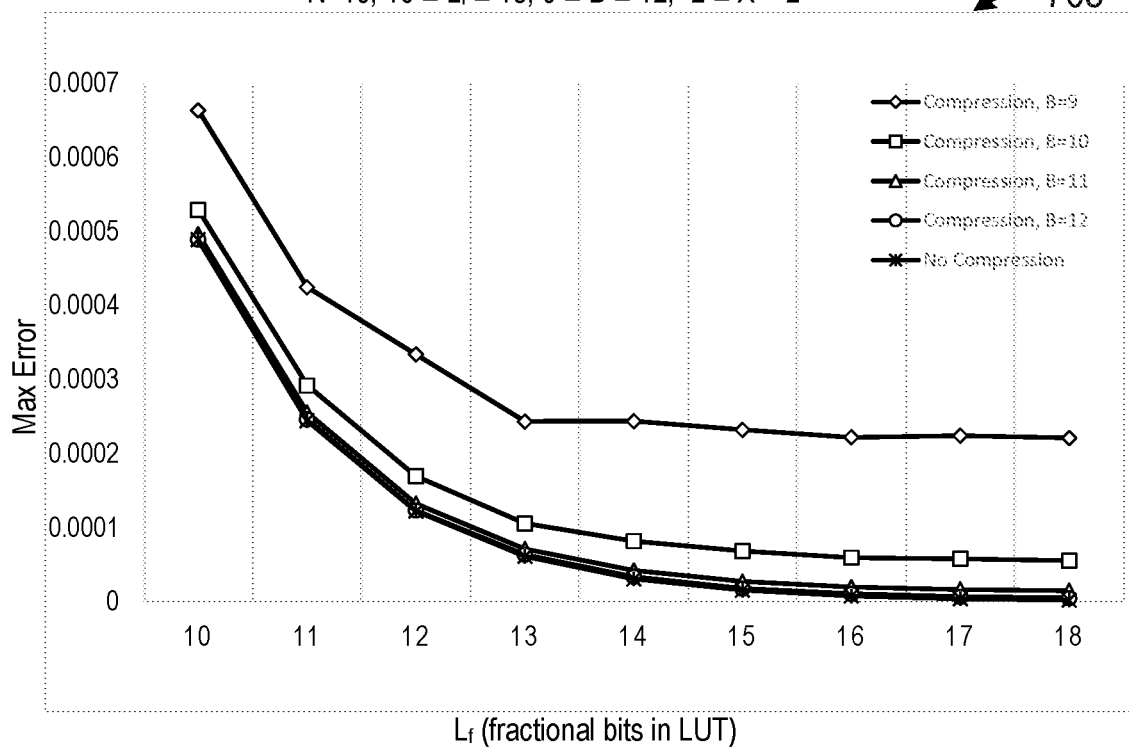
FIG. 7B depicts simulation results evaluating accuracy of an exemplary architecture as word width varies across a second, larger input dynamic range.
Figure 7B:
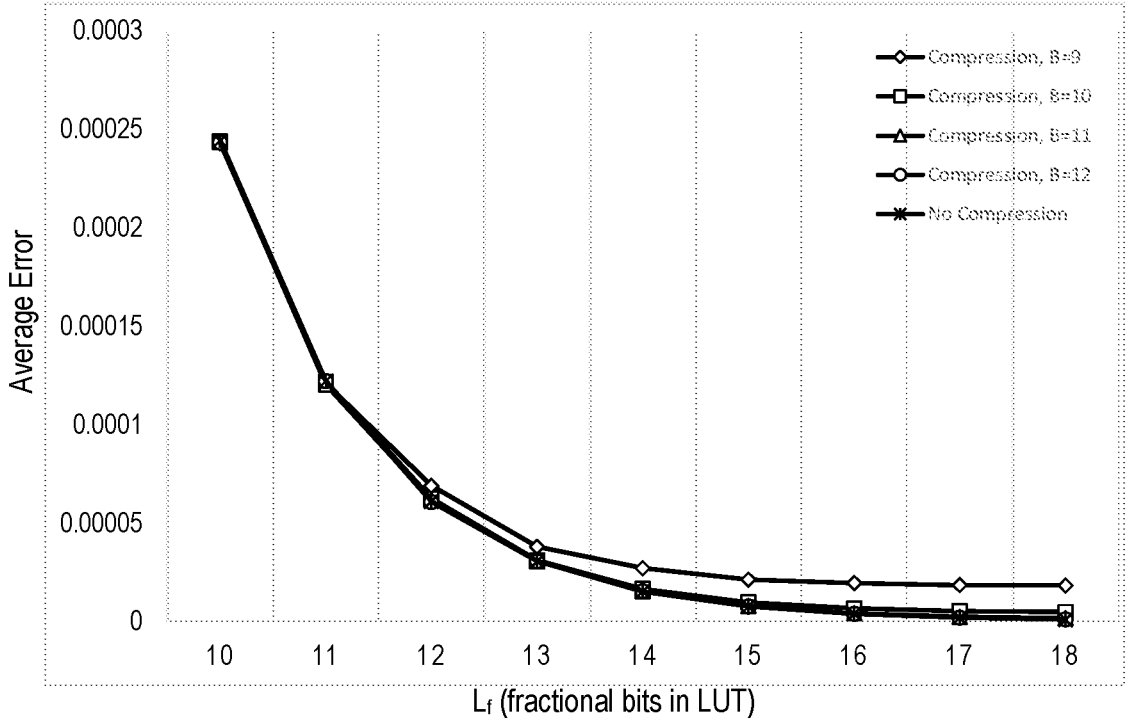

FIG. 7B depicts simulation results evaluating accuracy of an exemplary architecture as word width varies across a second, larger input dynamic range. Max error graph 703 compares the maximum error between an uncompressed implementation (e.g., an 'accurate' calculation of $e^X$) and a calculation in a compressed implementation, such as is shown in FIG. 3A, in a similar simulation scenario as shown in FIG. 7A, with the sole exception that the range of X is increased to [−2,2). Similarly, average error graph 704 compares the average error in the same simulation scenario. Each distinct compressed series on the graphs 703 and 704 represents a separate value of B for which $L_f$ is varied and plotted against the error.

As can be seen, the error again decreases in a generally exponential decay as $L_f$ increases, with improvements in accuracy diminishing as $L_f$ continues to be increased. Similarly, error decreases as B increases, also with diminishing returns. The improvements in error by increasing B and $L_f$ are more marked when evaluating max error than average error, in which responses to increased B and $L_f$ are often indistinguishable at this level. Most notably, with an increased range of X, B appears to have a strong effect on error, particularly on max error. For example, max error appears to flatline at approximately $2.5 \times 10^4$ when B=9, with increases in $L_f$ having little further effect after $L_f$=13. A noted improvement in both max error and average error is seen by increasing B to 10. The error of compressed vs uncompressed appears to converge by B=12. Accordingly, for a predetermined range of X, and a predetermined error limit, values for N, $L_f$, and B may be advantageously chosen to balance computational resources (e.g., memory size required by a lookup table as determined by a selected $L_f$, and multiplier and adder size) against accuracy and precision required to remain within the error limit.

Figure 8:
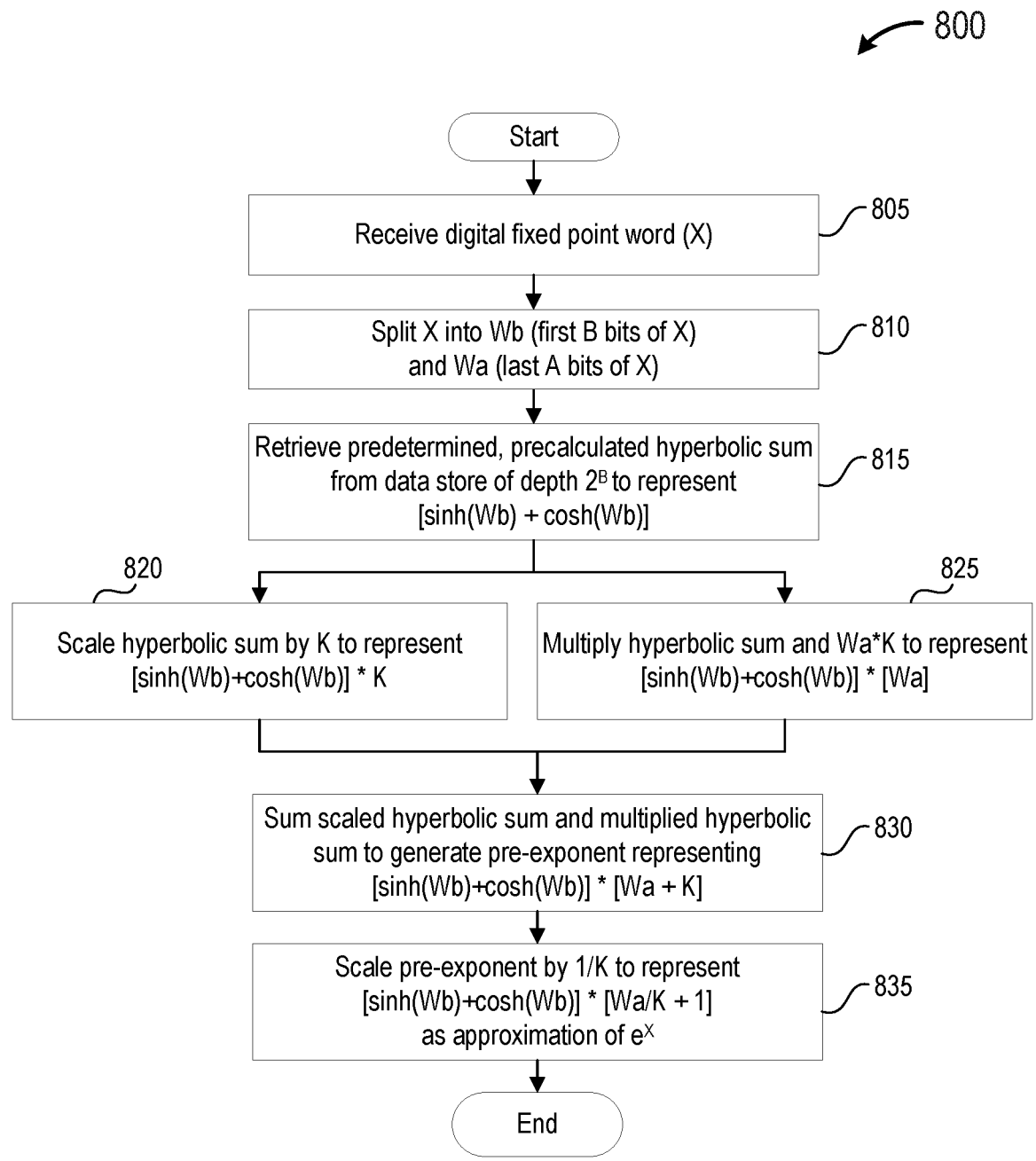
FIG. 8 depicts an exemplary compact and versatile method for calculating an exponent in a circuit.

FIG. 8 depicts an exemplary compact and versatile method for calculating an exponent in a circuit. The method 800, may for example, be embodied in a circuit such as the exemplary implementations described in reference to FIGS. 3A-3D, in computer program instructions for one or more controllers, or in a circuit design optimization system. A fixed point digital word X is received 805, which may be N bits long. Word X is split into two words, a first word Wb, being the first B bits of X), and a second word Wa, including the last A bits of X. Word X may represent an exponent to be used in computing a natural exponent, $e^X$. The fixed point digital word X may have been, for example, previously converted from a floating point value. First word Wb may include the binary point of X, and may include I integer bits and F fractional bits, where B=I+F. Second word Wa may be A bits long, where A=N−B, and X=Wb+Wa/K, K being a scaling factor. Accordingly, X bits may be addressed [0:N−1], Wb bits may be addressed as [B+1:N−1], and Wa may be addressed as [0:A].

First word Wb may define an address in a data store. The data store may contain, for example, predetermined and precalculated values of sinh(Wb)+cosh(Wb) for a predetermined range of X and a predetermined value of B, and may have a depth of $2^B$. A predetermined, precalculated hyperbolic sum is retrieved 815 from the data store, representing sinh(Wb)+cosh(Wb). The hyperbolic sum is multiplied 825 with Wa to represent [sinh(Wb)+cosh(Wb)]*[Wa]. The hyperbolic sum is scaled 820 by K to represent [sinh(Wb)+cosh(Wb)]*K. Scaling may be performed, for example, by right zero padding the hyperbolic sum by B-I bits, such that $K=2^{B-I}$.

The scaled hyperbolic sum and multiplied hyperbolic sum are then added 830 to generate a scaled exponential calculation representing [sinh(Wb)+cosh(Wb)]*[Wa+K]. The result is scaled 835 by scaling factor 1/K to represent [sinh(Wb)+cosh(Wb)]*[Wa/K+1] as an approximate representation of $e^X$. Scaling 835 may, for example be right-shifting of a fixed point value by B-I bits, corresponding to multiplying the represented value by $\frac{1}{2}^{B-I}$.

Method 800 may, for example, be implemented using a single multiply-accumulate unit in a resource-limited circuit requiring ROM of depth $2^B$ for a lookup table. B may, for example, be determined according to a predetermined range of values for X, according to a predetermined error limit.

Figure 9:
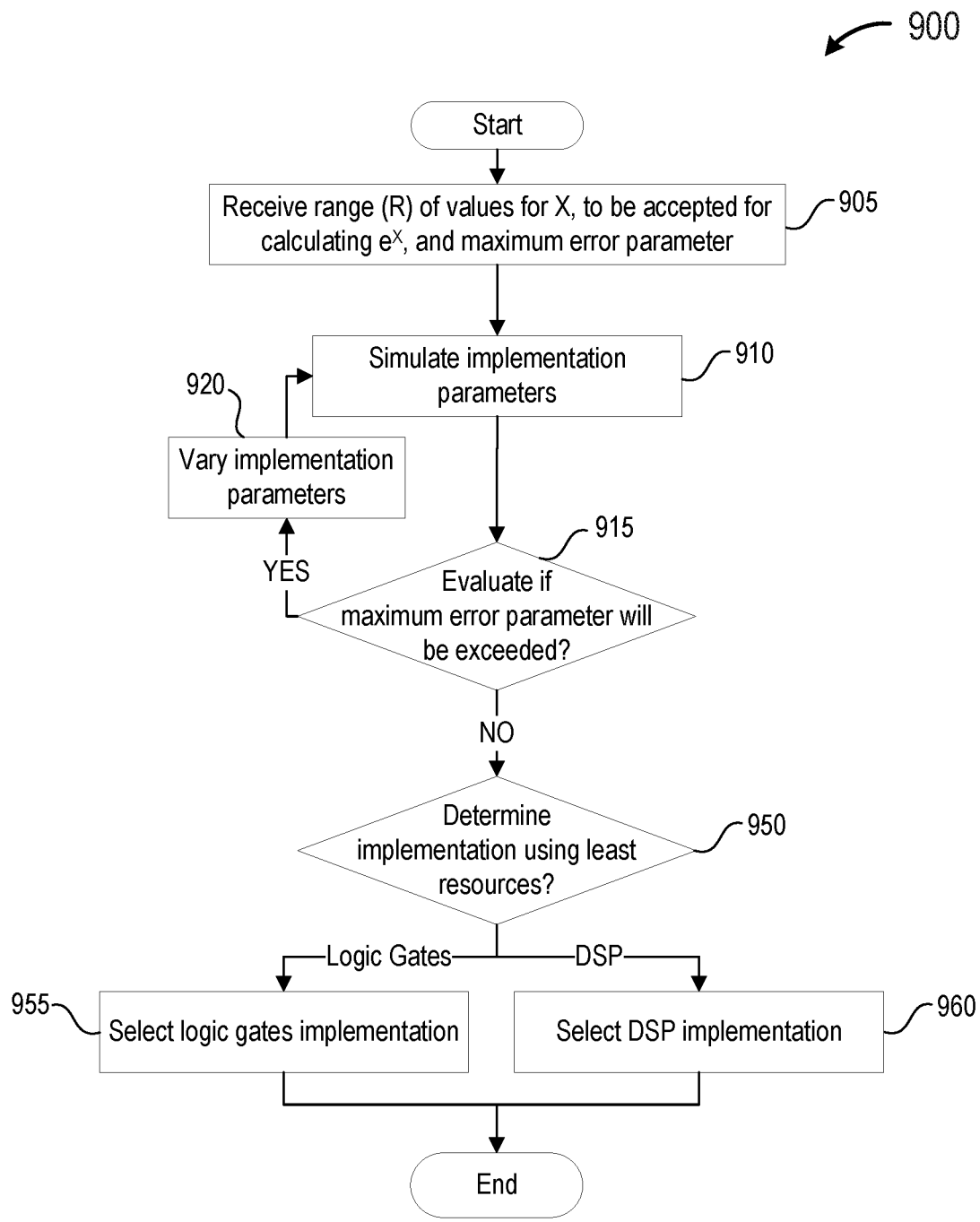
FIG. 9 depicts an exemplary method for optimizing configuration of a circuit to calculate an exponent.

FIG. 9 depicts an exemplary method for optimizing configuration of a circuit to calculate an exponent. Method 900 begins by receiving 905 a range of values for X and a maximum error parameter, for calculating $e^X$ according to a compressed calculation method, such as by exemplary method 800 depicted in FIG. 8. together with a maximum error parameter. Configuration simulation is then conducted simulating 910 implementation parameters. Implementation parameters may include, by way of example and not limitation, B, A, F, I, $L_f$, lookup table depth, or some combination thereof.

The results are evaluated 915 to determine if the maximum error parameter will be exceeded. If the maximum error parameter will be exceeded, the implementation parameters are varied 920 and simulation 910 repeated. If the maximum error parameter will not be exceeded, then the resources required by the implementation are determined 950 for multiple hardware configurations, including a logic gates implementation and a DSP implementation. The resources may be determined, for example, using a logic synthesis tool to produce design implementations using the predetermined implementation parameters to produce hardware implementation configurations which may include, for example, logic gates, DSP, BRAM, other appropriate hardware, or some combination thereof. The resource may, for example, be predetermined resources available on a predetermined FPGA or ASIC. The resources required may include, for example, number of logic gates, size of data store, and physical footprint. The hardware implementations are compared to determine which implementation uses the least resources. If the logic gate implementation is the most resource-efficient, it is selected 955. If the DSP implementation is the most resource-efficient, it is selected 960.

In various embodiments, hardware implementations to be compared may include implementations other than DSP and logic gates, and some implementations may omit a DSP, logic gates, or both. Some embodiments may evaluate a hardware implementation of a combination of DSP and logic gates, or multiple combinations thereof. Various embodiments of method 900 may, for example, be at least partially implemented in a synthesizer which may be advantageously used to configure FPGA firmware, design an ASIC, or otherwise configure circuits, program instructions, or some combination thereof. Some embodiments may, for example, be vendor specific, and be implemented in computer program instructions that allow a user to select various parameters, including R and maximum error, or ranges thereof, and select a resource-optimized configuration. Some embodiments may allow a user to compare resources used, calculation speed, error bounds, range of X given an error bound, other parameters of interest, or some combination thereof, based on constraints on one or more parameters of interest to the user.

Figure 10:
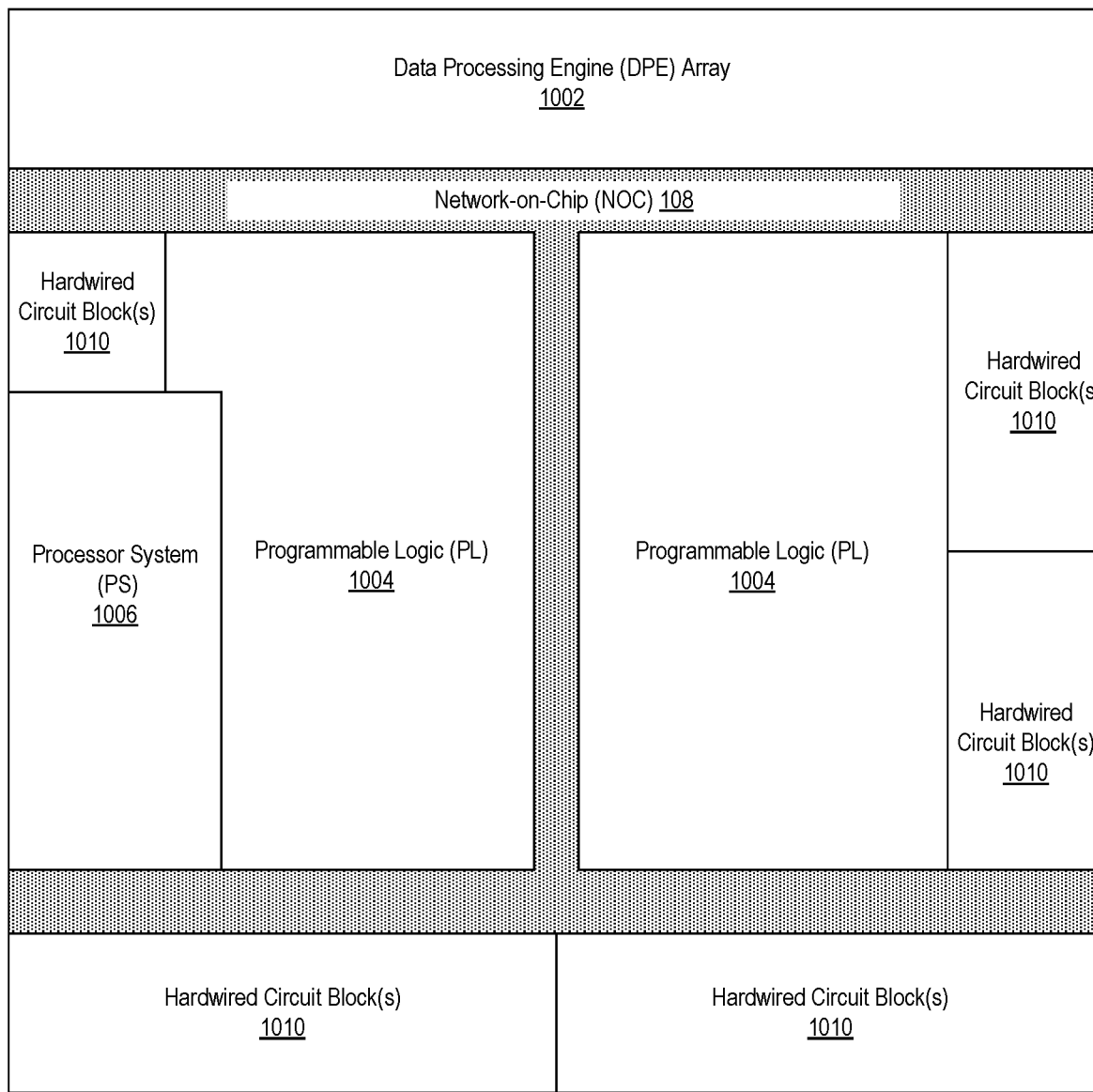
FIG. 10 illustrates an exemplary architecture for a System-on-Chip (SOC) on which the disclosed circuits and processes may be implemented.

FIG. 10 illustrates another example architecture for a System-on-Chip (SOC) on which the disclosed circuits and processes may be implemented. A SOC 1000 is an example of a programmable IC and an integrated programmable device platform. In the example of FIG. 10, the various, different subsystems or regions of the SOC 1000 illustrated may be implemented on a single die provided within a single integrated package. In other examples, the different subsystems may be implemented on two or more interconnected dies provided as a single, integrated package.

In the example, the SOC 1000 includes two or more regions having circuitry with different functionalities. In the example, the SOC 1000 optionally includes a data processing engine (DPE) array 1002. The SOC 1000 includes programmable logic (PL) regions 1004 (hereafter PL region(s) or PL), a processing system (PS) 1006, a Network-on-Chip (NOC) 1008, and one or more hardwired circuit blocks 1010. The DPE array 1002 is implemented as two or more interconnected, hardwired, and programmable processors having an interface to the other regions of the SOC 1000.

The PL 1004 is circuitry that may be programmed to perform specified functions. As an example, the PL 1004 may be implemented as field programmable gate array type of circuitry. The PL 1004 can include an array of programmable circuit blocks. Examples of programmable circuit blocks within the PL 1004 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within the PL 1004 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The PS 1006 is implemented as hardwired circuitry that is fabricated as part of the SOC 1000. The PS 1006 may be implemented as, or include, any of a variety of different processor types each capable of executing program code. For example, the PS 1006 may be implemented as an individual processor, e.g., a single core capable of executing program code. In another example, the PS 1006 may be implemented as a multicore processor. In still another example, the PS 1006 may include one or more cores, modules, co-processors, interfaces, and/or other resources. The PS 1006 may be implemented using any of a variety of different types of architectures. Example architectures that may be used to implement the PS 1006 may include, but are not limited to, an ARM processor architecture, an x86 processor architecture, a GPU architecture, a mobile processor architecture, a DSP architecture, or other suitable architecture that is capable of executing computer-readable instructions or program code.

NOC 1008 includes an interconnecting network for sharing data between endpoint circuits in the SOC 1000. The endpoint circuits can be disposed in the DPE array 1002, the PL regions 1004, the PS 1006, and/or in the hardwired circuit blocks 1010. The NOC 1008 can include high-speed data paths with dedicated switching. In an example, the NOC 1008 includes horizontal paths, vertical paths, or both horizontal and vertical paths. The arrangement and number of regions shown in FIG. 10 is merely an example. The NOC 1008 is an example of the common infrastructure that is available within the SOC 1000 to connect selected components and/or subsystems.

The NOC 1008 provides connectivity to the PL 1004, the PS 1006, and to selected ones of the hardwired circuit blocks 1010. The NOC 1008 is programmable. In the case of a programmable NOC used with other programmable circuitry, the nets that are to be routed through the NOC 1008 are unknown until a user circuit design is created for implementation within the SOC 1000. The NOC 1008 may be programmed by loading configuration data into internal configuration registers that define how elements within the NOC 1008 such as switches and interfaces are configured and operate to pass data from switch to switch and among the NOC interfaces.

The NOC 1008 is fabricated as part of the SOC 1000 and while not physically modifiable, may be programmed to establish connectivity between different master circuits and different slave circuits of a user circuit design. The NOC 1008, for example, may include two or more programmable switches that are capable of establishing packet switched network connecting user specified master circuits and slave circuits. In this regard, the NOC 1008 is capable of adapting to different circuit designs, where each different circuit design has different combinations of master circuits and slave circuits implemented at different locations in the SOC 1000 that may be coupled by the NOC 1008. The NOC 1008 may be programmed to route data, e.g., application data and/or configuration data, among the master and slave circuits of the user circuit design. For example, the NOC 1008 may be programmed to couple different user-specified circuitry implemented within the PL 1004 with the PS 1006, and/or the DPE array 1002, with different hardwired circuit blocks, and/or with different circuits and/or systems external to the SOC 1000.

The hardwired circuit blocks 1010 may include input/output (I/O) blocks, and/or transceivers for sending and receiving signals to circuits and/or systems external to the SOC 1000, memory controllers, or the like. Examples of different 1/O blocks may include single-ended and pseudo differential I/Os and high-speed differentially clocked transceivers. Further, the hardwired circuit blocks 1010 may be implemented to perform specific functions. Examples of the hardwired circuit blocks 1010 include, but are not limited to, cryptographic engines, digital-to-analog converters, analog-to-digital converters, and the like. The hardwired circuit blocks 1010 within the SOC 1000 may be referred to herein from time-to-time as application-specific blocks.

In the example of FIG. 10, the PL 1004 is shown in two separate regions. In another example, the PL 1004 may be implemented as a unified region of programmable circuitry. In still another example, the PL 1004 may be implemented as more than two different regions of programmable circuitry. The particular organization of the PL 1004 is not intended as a limitation. In this regard, the SOC 1000 includes one or more PL regions 1004, the PS 1006, and the NOC 1008. The DPE array 1002 may be optionally included.

In other example implementations, the SOC 1000 may include two or more DPE arrays 1002 located in different regions of the IC. In still other examples, the SOC 1000 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

A programmable integrated circuit (IC) refers to a type of device that includes programmable logic. An example of a programmable device or IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs). Modern programmable ICs have evolved to include programmable logic in combination with one or more other subsystems. For example, some programmable ICs have evolved into System-on-Chips or "SOCs" that include both programmable logic and a hardwired processor. Other varieties of programmable ICs include additional and/or different subsystems.

Although various embodiments may be implemented using reconfigurable programmable logic blocks (e.g., FPGA), other embodiments may be implemented in fixed instantiations (e.g., ASIC), or combined in a single integrated circuit (e.g., SOC) with programmable logic. While dedicated hard block circuitry in an ASIC implementation may not be reconfigurable once instantiated in an integrated circuit, for example, an ASIC implementation may, in some implementations, provide for a minimized platform with respect to, for example, power consumption and/or die area.

Although various embodiments have been described with reference to the figures, other embodiments are possible. For example, in various embodiments, a data store may be lookup table in an FPGA, stored in BRAM and implemented using some combination of flip flops (FFs), lookup table units (LUTs) such as individual logic gates, and DSPs. In some embodiments, the multiplying circuit and adding circuit may be implemented in a DSP. In some embodiments, the multiplying and adding circuit may be mapped to LUTs.

Table 1 illustrates a simulation of resources required in an exemplary FPGA provided with FFs, LUTs, BRAM36 (BRAM units of 36 kilobytes (kB)), and DSPs, in an implementation for N=16 bits, I=1 bit, $L_f$=20 bits, the number of bits (L) for each entry in the lookup table is 26, and the value of B is varied by 2 bit increments over the range [10,14]. As can be seen, the combination of resources may be varied to achieve a desired resource utilization in an implementation. For example, when B=10, the compressed calculation circuit can be entirely implemented using 1 DSP and one-half of a 36 kB BRAM unit, requiring no FFs or LUTs. When B=12, the compressed calculation circuit may be advantageously implemented using, for example, no DSP, and using 48 FFs, 63 LUTs and 1 BRAM unit. When B=14, the compressed calculation circuit may be advantageously implemented using, for example, less FFs and LUTs (36 and 33, respectively), increasing the number of BRAM units used to 4, and still using no DSPs. These implementations are provided by way of illustration and not limitation, and serve to demonstrate the flexibility of the compressed calculation method across various architecture configurations. Accordingly, calculation of the natural exponent may advantageously implemented across diverse architecture configurations in order to achieve a desired optimization, for example, of hardware resources, calculation accuracy, and calculation speed.

TABLE 1

Exemplary simulation comparing resource requirements of implementations.

| $N = 16, I = 1, L_f = 20, L = 26$ | FFs | LUTs | BRAM36 | DSPs |
|---|---|---|---|---|
| B = 10 | 0 | 0 | 0.5 | 1 |
| B = 12 | 48 | 63 | 1 | 0 |
| B = 14 | 36 | 33 | 4 | 0 |

Table 2 illustrates a similar simulation of resources as described in relation to Table 1, for an expanded input range of X, where N=28 bits, and B is varied in 2 bit increments over the range [14,18]. In the example implementation where B=14 bits, a single DSP is utilized, together with 4 BRAM units. In comparison, when B=16 and 18, a single DSP is utilized in combination with BRAM units and FFs and LUTs. These illustrative implementations provide further examples of the flexibility in resource combinations which may be advantageously achieved by calculating the natural exponent using a compressed calculation method.

TABLE 2

Exemplary simulation comparing resource requirements of implementations for an input word with increased bits.

| $N = 28, I = 1, L_f = 20, L = 26$ | FFs | LUTs | BRAM36 | DSPs |
|---|---|---|---|---|
| B = 14 | 0 | 0 | 4 | 1 |
| B = 16 | 1 | 5 | 16 | 1 |
| B = 18 | 3 | 20 | 64 | 1 |

In various embodiments, the compressed natural exponent calculation method and circuits described herein may advantageously replace implementations employing Taylor series, linear interpolation, or deep lookup tables. Such implementations may for example, consume several DSPs and memory units. Some embodiments may, for example, achieve a compression of lookup table size by at least half, and may reduce the DSP required to 1 DSP implementing a multiplier and adder or, for example, to eliminate the need for DSP by using LUTs and FFs.

Various examples may be implemented using circuitry, including various electronic hardware. By way of example and not limitation, the hardware may include transistors, resistors, capacitors, switches, integrated circuits and/or other devices. In various examples, the circuits may include analog and/or digital logic, discrete components, traces and/or memory circuits fabricated on a silicon substrate including various integrated circuits (e.g., FPGAs, ASICs). In some embodiments, the circuits may involve execution of preprogrammed instructions and/or software executed by a processor. For example, various systems may involve both hardware and software.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A natural exponent computation circuit comprising:
   a splitter circuit configured to receive a fixed point word and split it into a first word and a second word;
   a retrieval circuit configured to retrieve from a data store, at an address defined by the first word, a predetermined and precalculated hyperbolic sum;
   a multiplier circuit configured to multiply the predetermined and precalculated hyperbolic sum and the second word together, and to output a multiplied hyperbolic sum;
   a first scaling circuit configured to receive the predetermined and precalculated hyperbolic sum and scale it by a first factor;
   a summer circuit configured to add together the scaled hyperbolic sum and the multiplied hyperbolic sum and generate a scaled second sum; and
   a second scaling circuit configured to scale the scaled second sum by a second factor, and output an approximation of $e^x$.

2. The natural exponent computation circuit of claim 1, wherein the multiplier circuit and summer circuit are at least partially implemented in at least one digital signal processor (DSP).

3. The natural exponent computation circuit of claim 1, wherein at least one of the following are at least partially implemented as logic gates: the multiplier circuit, the summer circuit, and the data store.

4. The natural exponent computation circuit of claim 1, wherein the data store is a lookup table.

5. The natural exponent computation circuit of claim 4, wherein the lookup table is configured to store entries in a fixed point format.

6. The natural exponent computation circuit of claim 5, wherein the lookup table has depth of 2B, where B is a total number of bits in the first word.

7. The natural exponent computation circuit of claim 1, wherein the data store is configured to store entries in a floating point format.

8. The natural exponent computation circuit of claim 1, wherein:
the first factor is $2^{B-I}$,
where B is a total number of bits of the first word, and I is a total number of integer bits in the first word, and
the first scaling circuit right zero pads the predetermined and precalculated hyperbolic sum by B-I bits.

9. The natural exponent computation circuit of claim 1, wherein:
the second factor is $1/(2^{B-I})$, where B is a total number of bits, and I is a total number of integer bits in the first word, and
the second scaling circuit bitwise right shifts the scaled second sum by B-I bits.

10. The natural exponent computation circuit of claim 1, further comprising a floating point to fixed point conversion circuit before the splitter circuit, and
wherein the conversion circuit is configured to receive a floating point input and convert it the floating point input into the fixed point word received by the splitter circuit.

11. The natural exponent computation circuit of claim 1, further comprising a fixed point to floating point conversion circuit after the second scaling circuit, and wherein the conversion circuit is configured to receive the output approximation of $e^x$ in a fixed point format and output it the approximation of $e^x$ in a floating point format.

12. The natural exponent computation circuit of claim 1, wherein the second word represents a numerical value less than 1.

13. The natural exponent computation circuit of claim 1, wherein:
the fixed point word is N bits long,
the first word is the first B bits of the fixed point word,
the second word is the last A bits of the fixed point word, N=A+B, and
a binary point of the fixed point word is contained in the first word.

14. The natural exponent computation circuit of claim 13, wherein B is chosen such
that the approximation of $e^x$ is accurate within a predetermined error limit.

15. A method to efficiently calculate an exponent in a digital circuit, the method comprising:
receiving, by a splitter circuit, a digital fixed point word, X, being N bits long;
splitting, by the splitter circuit, the first B bits of X into a first word, Wb, and the remaining A bits of X into a second word, Wa, wherein the first word comprises I integer bits and B-I fractional bits, and wherein N=A+B and X=Wb+Wa;

retrieving, by a retrieval circuit, from a data store, at an address defined by Wb, a predetermined and precalculated hyperbolic sum representing sinh(Wb)+cosh(Wb);
multiplying, by a multiplier circuit, the predetermined and precalculated hyperbolic sum and Wa together, and generating a multiplied hyperbolic sum representing [sinh(Wb)+cosh(Wb)r[*Wa];
scaling, by a first scaling circuit, the predetermined and precalculated hyperbolic sum by a scaling factor K to generate a scaled hyperbolic sum representing [sinh(Wb)+cosh(Wb)]*K;
summing, by a summer circuit, the scaled hyperbolic sum with the multiplied hyperbolic sum, to generate a scaled second sum representing [sinh(b)+cosh(b)]*[Wa+K]; and
scaling, by a second scaling circuit, the scaled second sum by 1/K, thereby generating a representation of [sinh(Wb)+cosh(Wb)r[Wa/K+1] as an approximation of $e^x$.

16. The method of claim 15, wherein the multiplying step and the summing step are at least partially implemented in at least one digital signal processor (DSP).

17. The method of claim 15, wherein:
the data store is a lookup table configured to store entries in a fixed point format, and
the lookup table has depth of $2^B$.

18. The method of claim 15, wherein:
Wb comprises a binary point of X,
K is $2^{B-I}$,
scaling the predetermined and precalculated hyperbolic sum by K comprises right zero padding the predetermined and precalculated hyperbolic sum by B-I bits, and
scaling the scaled second sum by 1/K comprises bitwise right shifting of the scaled second sum by B-I bits.

19. The method of claim 15, wherein B is chosen such that the approximation of $e^x$ is accurate within a predetermined error limit.

20. At least one non-transient computer readable medium providing a program of instructions that, when executed by a processor, cause operations calculate a natural exponent, the operations comprising:
receiving, by a splitter circuit, a digital fixed point word, X, being N bits long;
splitting, by the splitter circuit, the first B bits of X into a first word, Wb, and the remaining A bits of X into a second word, Wa, wherein the first word comprises I integer bits and B-I fractional bits, and wherein N=A+B and X=Wb+Wa;
retrieving, by a retrieval circuit, from a data store, at an address defined by Wb, a predetermined and precalculated hyperbolic sum representing sinh(Wb)+cosh(Wb);
multiplying, by a multiplier circuit, the predetermined and precalculated hyperbolic sum and Wa together, and generating a multiplied hyperbolic sum representing [sinh(Wb)+cosh(Wb)]*[Wa];
scaling, by a first scaling circuit, the predetermined and precalculated hyperbolic sum by a scaling factor K to generate a scaled hyperbolic sum representing [sinh(Wb)+cosh(Wb)]*K;
summing, by a summing circuit, the scaled hyperbolic sum with the multiplied hyperbolic sum, to generate a scaled second sum representing [sinh(b)+cosh(b)]*[Wa+K]; and scaling, by a second scaling circuit, the scaled second sum by 1C/K, thereby generating a representation of $[\sinh(Wb)+\cosh(Wb)]*[Wa/K+1]$ as an approximation of $e^x$.

* * * * *

UNITED STATES PATENT AND TRADEMARK OFFICE
CERTIFICATE OF CORRECTION

PATENT NO. : 11,403,068 B2
APPLICATION NO. : 17/001060
DATED : August 2, 2022
INVENTOR(S) : Stefano Cappello It is certified that error appears in the above-identified patent and that said Letters Patent is hereby corrected as shown below:

In the Specification

Column 9, Line 26, Delete "3000" and insert -- 300C --, therefor.

In the Claims

Column 20, Line 8, In Claim 15, delete "cosh(Wb)r[*Wa];" and insert -- cosh(Wb)*[Wa]; --, therefor.

Column 20, Line 20, In Claim 15, delete "cosh(Wb)r[Wa/K+1]" and insert -- cosh(Wb)*[Wa/K+1] --, therefor.

Column 21, Line 2, In Claim 20, delete "1C/K," and insert -- 1/K, --, therefor.

Signed and Sealed this
Fourteenth Day of February, 2023

Katherine Kelly Vidal
*Director of the United States Patent and Trademark Office*